UNITED STATES PATENT OFFICE.

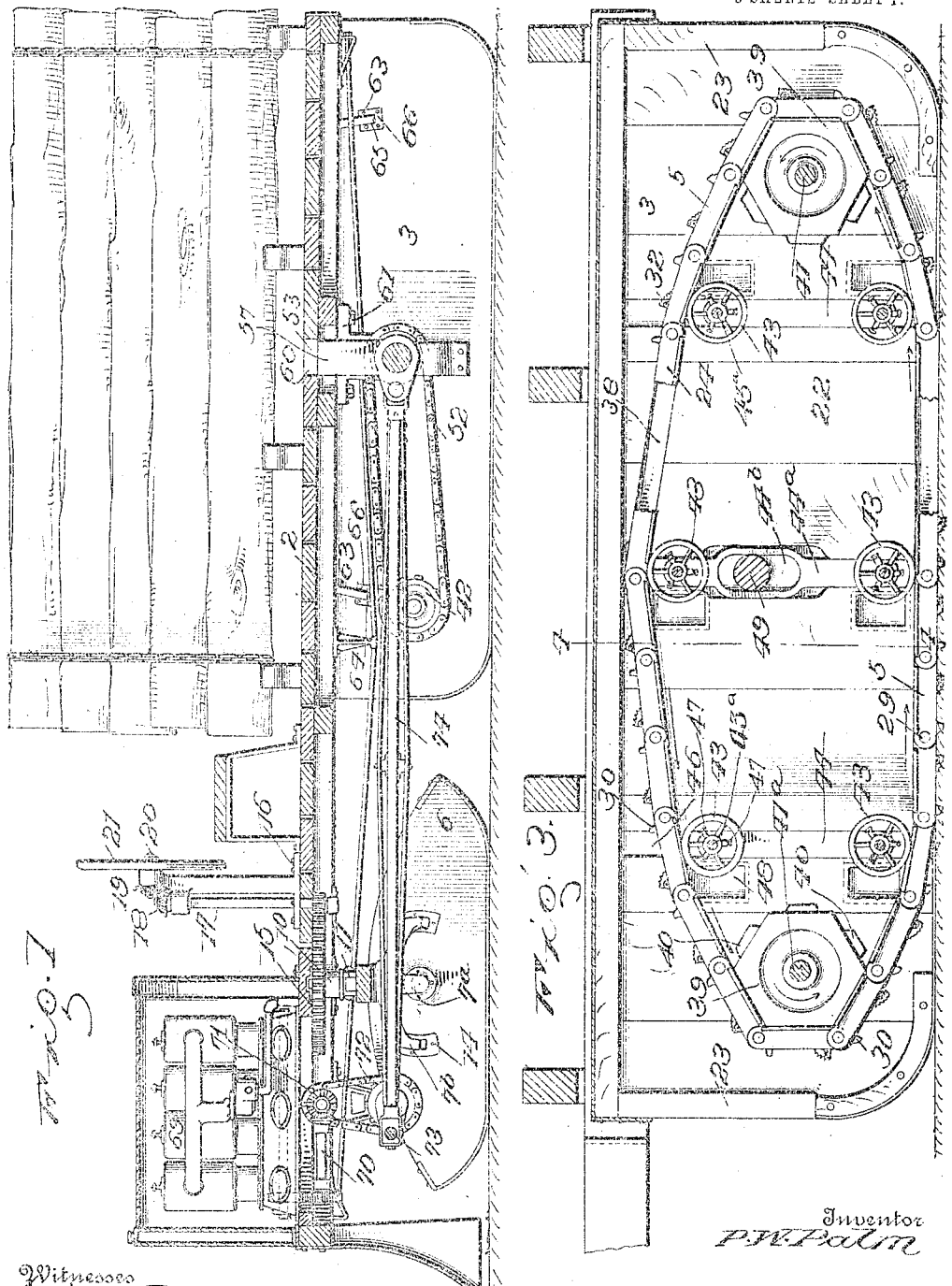

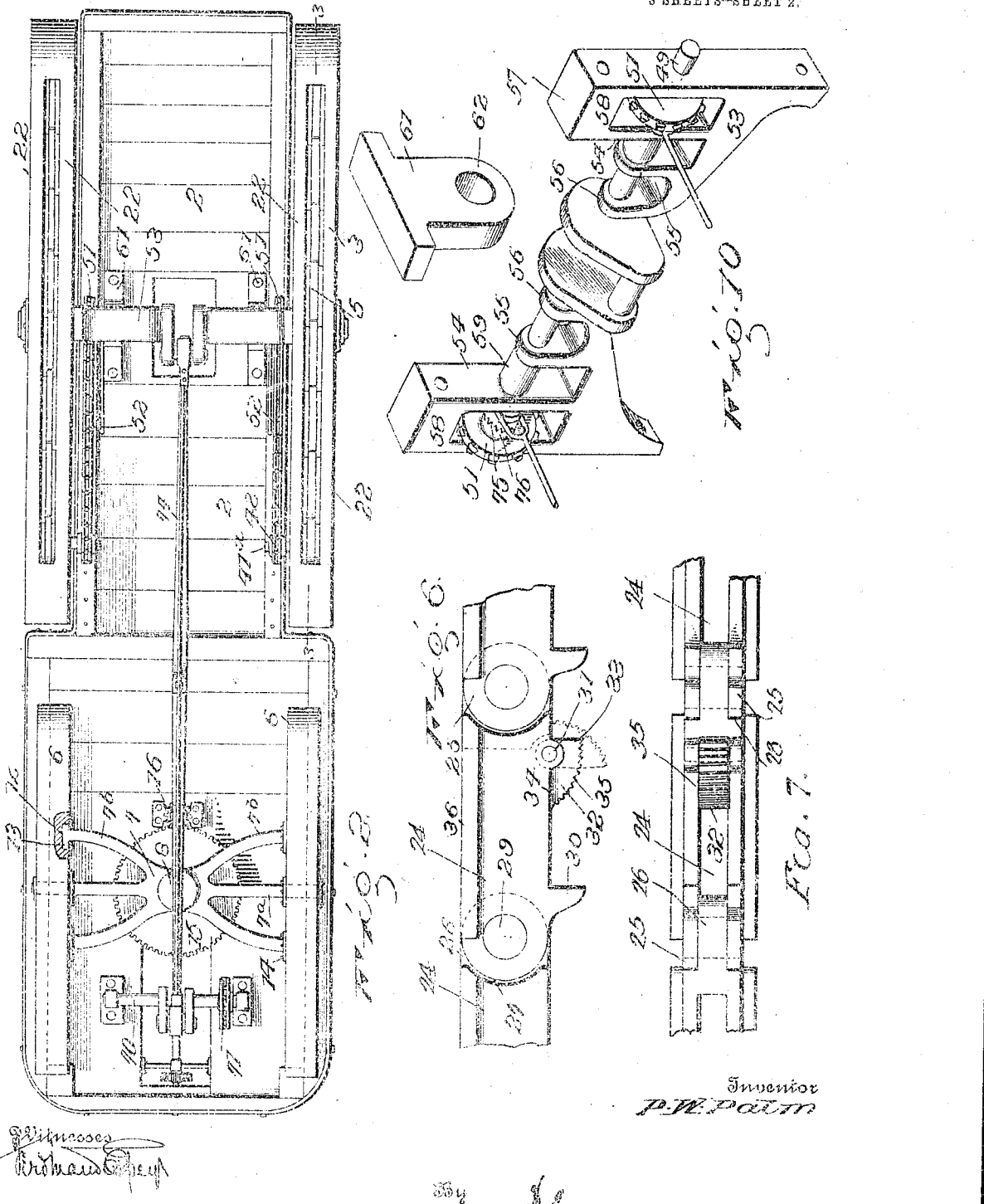

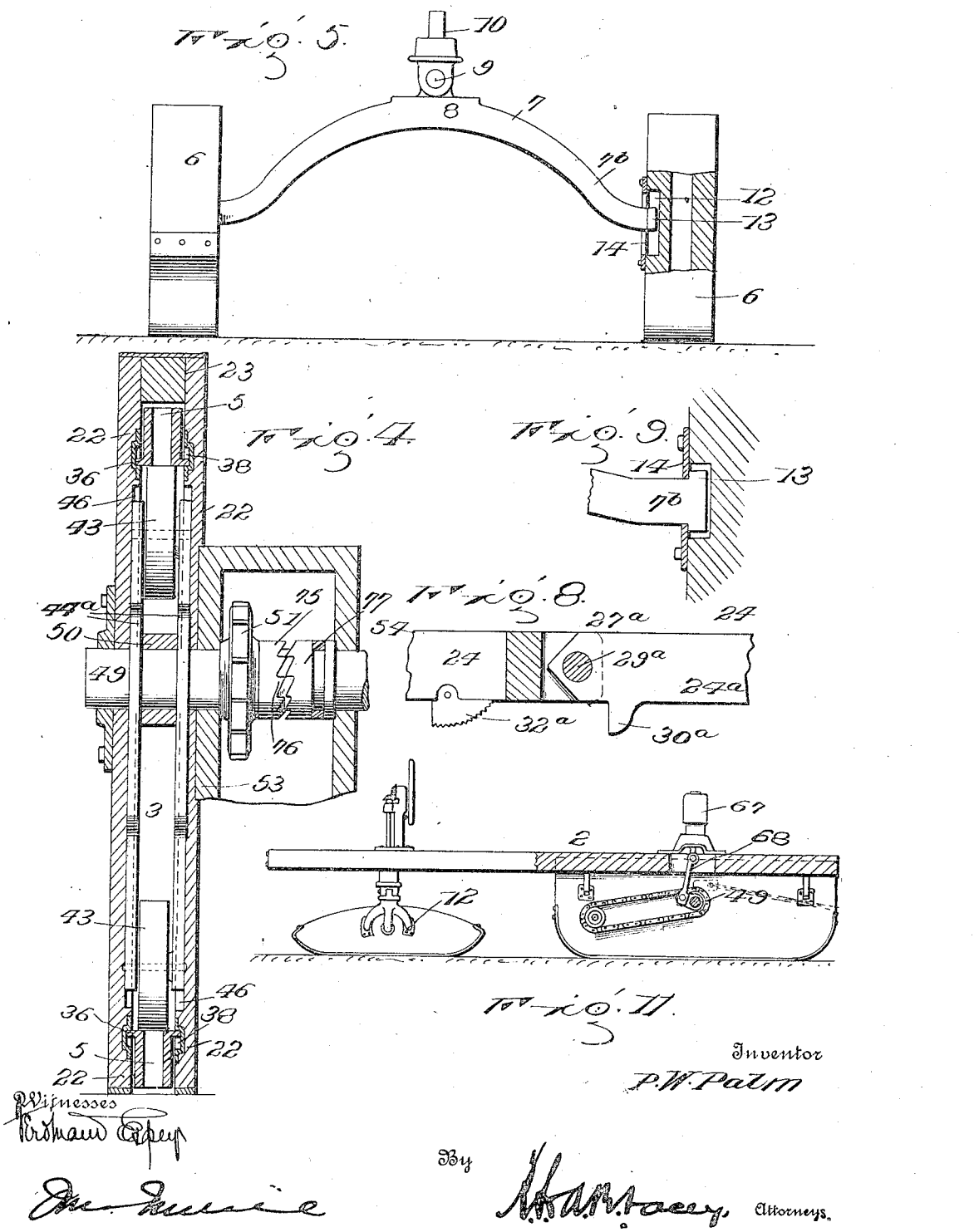

PER W. PALM, OF BAUDETTE, MINNESOTA.

MOTOR-SLED.

1,127,501. Specification of Letters Patent. Patented Feb. 9, 1915.

Application filed September 13, 1912. Serial No. 720,300.

*To all whom it may concern:*

Be it known that I, PER W. PALM, citizen of the United States, residing at Baudette, in the county of Beltrami and State of Minnesota, have invented certain new and useful Improvements in Motor-Sleds, of which the following is a specification.

My invention relates to motor driven vehicles, and particularly to motor driven sleds or sleighs.

The main object of my invention is to provide a motor driven sled or sleigh in which traction is secured by the use of endless traction elements housed in the runners of the sled.

Another object is the provision of a motor driven sled in which the endless traction elements are yieldingly mounted so as to accommodate themselves to travel either over a rough or an even surface, and over either relatively soft snow or hard ice.

A further object is to provide means whereby a motor driven sled may be either driven forward or backward as desired, and particularly in this connection to provide a traction element having dogs or teeth rigidly mounted for driving the sled forward, and a series of dogs or teeth, which when the endless traction element is driven backward will be caused to project so as to engage the ground.

A further object is to provide a motor driven sled whose runners are so mounted with relation to the body that the runners may have free pivotal movement with relation to the body, each runner independent of any other runner of the sled, so as to provide a sled in which the runners will accommodate themselves to the inequalities of the surface over which the sled moves.

A further object is to provide a motor driven sled with hollow runners within which the traction devices are disposed and provide means whereby the wheels supporting the endless traction elements may be readily oiled.

A further object is to provide yielding means normally acting to force the prongs or teeth of the endless traction element into tractive engagement with the surface over which the sled moves.

A further object is to provide means whereby the sled may be driven from an engine disposed over the forward runners, thus leaving the rear portion of the sled entirely free for the support of merchandise.

Still another object is to provide a very effective form of steering gear whereby the forward runners may be shifted to guide the sled.

Other objects will appear in the course of the following description.

An embodiment of my invention is illustrated in the accompanying drawings, wherein:

Figure 1 is a longitudinal section of a motor driven sled constructed in accordance with my invention; Fig. 2 is an underside plan view thereof; Fig. 3 is a vertical enlarged section of one of the rear runners on the line 3—3 of Fig. 2, the traction element disposed within the runner being shown in elevation; Fig. 4 is a vertical section on line 4—4 of Fig. 3, the section being on a relatively large scale; Fig. 5 is an elevation partly in section of the forward runners showing the manner in which they are connected to the frame of the sled; Fig. 6 is a fragmentary side elevation of a portion of the traction chain; Fig. 7 is an under side plan view of the link shown in Fig. 6; Fig. 8 is a fragmentary sectional view of a modified form of traction chain; Fig. 9 is a fragmentary detail view showing a portion of one of the side runners in section and its engagement with one of the rear braces; Fig. 10 is a detail view of the support for the shafts of the rear runners; and Fig. 11 is an elevation partly in section of a sled constructed in accordance with my invention and showing a modified manner of driving the endless traction elements.

Referring to these drawings, 2 designates the body of the sled which may be of any suitable material, and have, generally speaking, any suitable form. Preferably and as illustrated, the rear portion of the sled is narrower than the front portion so as to accommodate the rear runners 3. As illustrated in Figs. 2, 3 and 4, the rear runners are hollow so as to inclose within them the endless traction element designated generally 5, the detail of which will be later described. The forward end of the sled is supported on front runners 6. These runners are solid inasmuch as they are not intended to house any traction elements. The forward runners are supported upon the body of the sled by means of braces 7. These braces, as illustrated in Figs. 2 and 5, are three in number on each side of the sled, and meet as at point 8 where they are pivoted by means of a bolt 9 to an upwardly projecting vertically disposed pivot pin or king bolt 10, which is rotatably mounted in any suitable manner within a bearing 11 supported upon the underside of the sled. As before stated, there are three of these braces 7 on each side. The middle brace 7ᵃ on each side is pivotally connected to the runners 6 so that the runners 6 are rotated in a vertical plane. The laterally disposed braces 7ᵇ on each side of the brace 7ᵃ, however, have a sliding connection with the runners, as illustrated in Fig. 5 and Fig. 9, that is, each of the runners on each side of the middle is formed with an arcuate curved slot 12, and the brace 7ᵇ is formed with a T-shaped head 13 which moves vertically in this slot, the head being held in place within the slot by a slotted plate 14 bolted or otherwise attached to the runners. It will thus be seen that the forward runners are pivotally mounted for movement in a vertical plane, and that both runners are also mounted for pivotal movement in a horizontal transverse plane upon the pivot pin or bolt 9, and further that the pair of runners is rotatably movable in a horizontal plane upon the king bolt 10. Thus the runners will accommodate themselves to inequalities in the ground so that not only may the forward end of each runner be higher or lower than the rear end, but that one runner may be disposed on a higher plane than the other runner.

The forward runners turn in a horizontal plane for steering movement by means of a gear wheel 15 attached to or mounted upon the king bolt 10, and which is engaged by a pinion 16 mounted upon a vertical shaft 17 supported in suitable bearings and carrying at its upper end a bevel gear wheel 18 which meshes with a bevel gear wheel 19 on a horizontal shaft 20 carrying the steering wheel 21.

It will be obvious that by rotating the steering wheel 21 in one direction or the other the forward runners may be turned in one direction or the other. It will further be obvious that the free play of the forward runners in a vertical plane does not interfere with the steering of the vehicle.

By reference to Figs. 2, 3 and 4 it will be seen that the rear runners are composed of spaced sides 22 held apart at their ends by means of spacing members 23. The bottom of the runner is open and disposed within each runner is a traction element 5, composed of a plurality of links 24, these links being illustrated in Figs. 6 and 7. Each link in the form shown in Figs. 6 and 7 is bifurcated at one end as at 25 and its opposite end is reduced in thickness to form an ear 26.

The bifurcated end of each link is rounded as at 27, while the wall of the reduced portion 26 is concave as at 28, see Fig. 6, so that the links will fit one within the other and have a firm engagement with each other. The links are, of course, pivoted to each other by pintles 29. Each link is provided at one end with a downwardly projecting lug 30, one face of this lug being inclined and the other face perpendicular to the longitudinal axis of the link and adjacent the other end of the link. Each link is provided with downwardly projecting ears 31 between which is pivoted a tooth 32. This tooth has two straight faces 33 and 34 at right angles to each other and a curved serrated face 35. In its normal position the tooth is so turned that the face 34 bears against the under edge of the link, while the face 33 extends vertically downward. The tooth, however, is adapted to be turned to the position shown in dotted lines in Fig. 6 by contact with the surface of the snow or ice so that the face 34 will be extended vertically downward and the face 33 will come in contact with the under side of the link. The purpose of this construction is to provide for reversing the movement of the sled. Normally the traction element runs in the direction of the arrow, Fig. 6, and the tooth 30 engages with the snow or ice to propel the sled forward. If, however, the direction of movement of the traction chain is reversed the inclined faces of the teeth 30 will prevent the teeth from engaging with the surface but the contact of the surface with the serrated face 35 of the tooth 32 will cause the tooth to rotate to the position shown in dotted lines, thus causing the tooth 32 to bite into the surface and permit the traction chain to propel the sled rearward.

In place of having the end of one link convexly rounded and fitting within the concavely curved end, as shown in Fig. 6, I may provide one end of the link with a triangular face, as shown in Fig. 8, wherein the links are designated 24ᵃ, the forward teeth 30ᵃ, the pivoted teeth 32ᵃ, the pivot pin 29ᵃ, and wherein the forward end of each link is formed with the angular faces 27ᵃ.

As will be seen from Fig. 6, each link is formed along its entire length with a rib designated 36, this rib being preferably located at the upper edge of the link. This rib is formed on both sides of the link.

The interior face of each side member 22 of each runner is grooved as at 38 to form a track within which the ribs of the links extend and by which the endless element is carried in a closed path. This groove is relatively wide so as to permit a vertical play of the links for the purpose to be hereafter stated.

Disposed at opposite ends of the runners are the wheels or disks 39 which carry the endless element. These wheels are preferably polygonal in form, and each face of the wheel has a length equal to the length of a link between the pivotal centers thereof, as illustrated in Fig. 3. Each of the angular faces of the wheel is provided with a centrally disposed arcuate rib 40 which engages with a slot or recess formed on the middle line of each link. These wheels 39 are mounted upon shafts 41 which in turn are supported in the side pieces 22 of the runner. One of these shafts, namely shaft 41$^a$, extends through the runner, and is provided with a sprocket wheel 42, as illustrated in Fig. 1, whereby the endless element may be driven.

In order to support the flights of the endless element, and in order further to yieldingly force the endless element downward so as to provide a straight horizontal flight as long as possible extending along the bottom of the runner I provide a plurality of pairs of idler wheels 43, each pair being mounted on a vertically disposed slide 44 disposed in grooves 46 formed in the inside faces of the side pieces 22. The wheels 43 rotate freely upon the supporting shafts 43$^a$ and the hubs of the wheels are preferably provided with lubricant ducts designated 47, as illustrated in Fig. 3. In order to secure access to the lubricant ducts so that the wheels 43 may be lubricated, I provide the outside wall 22 of each runner with doors 48 disposed adjacent one to each of the wheels 43. These wheels and the slide 44 have a free vertical movement through a limited distance, and the lowermost wheels bear downward upon the lower flight of the endless traction element 5 so as to force the teeth of the endless element into the surface to permit the endless traction element to be forced upward when necessary. A middle pair of wheels 43 is also provided, these being mounted upon a slide 44$^a$ which is slotted as at 44$^b$ to accommodate the driving shaft 49. These wheels 43 and the slides 44 are very important. When the roads are hard snow or consist of ice, the endless element will be forced upward. When, however, the snow is soft the endless element will be pressed down by the wheels 43 and the slides 44. Under such circumstances the endless element will always keep close to the surface. The wheels 39 must be so placed that the points of the calks or teeth 30 and 32 will not go below the runners, but just even therewith. The endless element, however, cannot be projected outside of the runners as the rib on each link will engage the groove in the sides of the runners.

Each runner is formed at its center with a bearing designated 50, see Fig. 4, through which the shaft 49 passes. This bearing is disposed immediately at the middle of the runner so that the runner has free rotation in a vertical plane upon the shaft 49 as a center.

The shaft 49 is the driving shaft by which power is transmitted from the engine. As illustrated, this shaft has the form of a crank shaft, the crank or cranks disposed at the middle of the shaft being operatively connected to the engine, as shown in Fig. 2 and Fig. 11. Mounted upon the opposite ends of the shaft 49 are sprocket wheels 51 over each of which a sprocket chain 52 passes, this sprocket chain passing over the corresponding sprocket wheel 42 whereby the endless traction element 5 is driven.

For the support of the shaft 49, I preferably attach to the inside pieces 22 of each runner, the yoke or bracket illustrated in Fig. 10, and also shown in Fig. 4. This bracket is designated 53. The bracket has projecting upwardly from it the arms 54, 55 and 56 spaced from each other, the arm 54 being connected to the base 57 of the bracket as at 58. The arms 55 and 54 are connected by means of a tubular barrel 59. The crank shaft 49 passes through a bearing in the arm 56, the arm 55, barrel 59, the arm 54, and the base 57.

The floor or body 2 of the sled is cut away as at 60 to accommodate the upper end of the bracket and permit the runners and the brackets to have free rotation upon the shaft 49 to a limited extent. Yokes or bearings 61 are attached to the under face of the body 2, one on each side of the body and through the opening 62 in each yoke the corresponding barrel 59 passes so that the bracket is pivotally connected to the body of the sled. The sprocket wheels 51 are disposed upon the shaft 49 between the arm 54 and the base 57. It will be seen that this manner of mounting the driving shaft 49 and connecting it to the sled runners provides for a very firm support for the shaft and at the same time provides for a free rocking movement of the rear sled runners in a vertical plane, and that this rocking movement will not affect in any way the driving of the chain or endless traction element 5. The body 2 of the sled is also connected to the runners by means of arms 63 depending from the under side of the body and angularly bent at their ends and provided with enlarged heads like heads 13 on arms 7^b entering recesses 65, these recesses being covered by plates 66 in the same manner as before described with reference to the arms 7 and the recess 12. Thus, while the runners are prevented from any lateral movement by reason of these braces, the braces do not impede any tilting movement of the runners.

I do not wish to be limited to any particular manner of driving the motor sled as it is obvious that the driving shaft 49 might be connected with a motor in any suitable manner.

In Fig. 11 I have illustrated a very simple method of driving the endless elements of the rear runners and in this form of my invention the motor engine 67 is mounted upon the rear end of the sled, and has a connecting rod 68 which extends down through a slot in the sled bottom and is directly connected to the crank shaft 49. This construction, however, places the motor 67 at some distance from the steering wheel, and to avoid this I preferably mount the motor upon the forward end of the sled in the manner shown in Fig. 1. In this construction the motor (which is shown as a multi-cylinder gasolene motor) is designated 69, and is operatively connected to a shaft 70 which in turn is operatively connected to a sprocket wheel 71 from which a sprocket chain 72 extends downward to a crank shaft 73. This crank shaft is connected by means of one or more connecting rods 74 to the crank shaft 49.

I have illustrated in Figs. 1 and 2 only one connecting rod 74, but it is obvious that a plurality of connecting rods might be used. Preferably the sprocket wheels 51 are independently driven from the crank shaft 49, and to this end each sprocket wheel is mounted upon a sleeve 75 carrying a clutch member 76 which engages with a clutch member 77 mounted upon the driving shaft 49, levers being provided whereby the clutches may be thrown into and out of engagement. By this construction it is possible to drive only one of the endless traction elements, leaving the other to run idle, and thus the sled may be guided or turned very quickly in one direction or the other and very materially assist the steering action of the front runners 6. The front runners 6 are preferably laterally rounded upon their lower faces, but the rear runners are preferably flat upon their lower faces.

The operation of my invention will be entirely clear from what has gone before. When the motor is in operation, the endless traction elements 5 will be rotated in the direction of the arrow, Fig. 3, and this will act to propel the sled in a forward direction. When the engine is reversed, the pivoted teeth will be thrown downward so as to bite into the surface, thus permitting the reverse movement of the endless elements to propel the sled rearward.

I do not wish to be limited to the use of my mechanism as a hauling sled, nor as a work sled, as it is obvious that the same construction herein detailed might be applied to sleighs.

It is obvious that my sled is so constructed that it will travel over very rough and uneven ground and, therefore, is particularly adapted as a wood sled or for use in hauling timber.

As before stated, the whole power of the engine acts to force the endless traction elements downward. In detail it may be said that my mechanism operates to this end as follows. When the engine is operating and the wheel 39 is rotating in the direction of the arrow, Fig. 3, the upper or slack portion of the endless element will tend to straighten out. Consequently, the idler wheels 43 will be pressed down upon the lower flight of the belt with just the same power as it takes to move the motor sled forward. In other words, the pressure of the endless traction element downward on the idler wheels is just as great as the power transmitted to it. When the engine is reversed, the endless traction element will be pressed upward by the same power because the lower flight of the traction element is trying to become straight. When the roadbed is too hard for the traction element, it will be pressed upward. When, however, the road is level, the calks will be pressed down even if the road consists of solid ice. When the roads are rough so that the runners are supported on both ends, the middles of the runners being free, the traction element of course will move down to engage the roadbed, and when the road is soft, the belt even then will be forced downward.

Having described my invention, what I claim is:

1. A motor sled including a sled runner hollow and open along its lower edge, oppositely disposed wheels mounted in the interior of the sled runner, an endless traction chain moving over said wheels and having an upper and a lower flight, and sliding vertically-disposed members mounted within the runner, the upper and lower ends of said members engaging the upper and lower flights of the traction element respectively and urging said element downward.

2. A motor sled including sled runners each hollow and open along its lower edge, oppositely disposed wheels mounted within the sled runners, an endless traction chain composed of links passing over said wheels and having an upper and a lower flight, vertically movable slides within the runner and between said flights, and wheels carried by said slides engaging the upper and lower flights respectively.

3. A motor sled including a sled runner hollow and open along its lower edge, forward and rear wheels, a traction element composed of an endless chain passing over said wheels, and spacing members mounted within the runner and between the upper and lower flights of the chain, the spacing members being longer than the diameter of said wheels, and wheels carried at the ends of the spacing members.

4. A motor sled including a sled runner hollow and open along its lower edge, oppositely disposed wheels mounted within the runner, an endless traction chain passing over said wheels and composed of toothed links, vertically disposed sliding members mounted in the sides of the runners between the flights of the traction chain, said members being freely movable vertically, wheels carried upon the upper and lower ends of the slides and over which said chain passes, said members being longer than the diameter of the first named wheels to space the upper and lower flights of the chain.

5. In a motor sled, a hollow runner open along its bottom edge, oppositely disposed wheels mounted within said runner and above the lower edge of the runner, a loose traction chain composed of toothed links passing over said wheels, and three vertically movable sliding spacing members disposed between the upper and lower flights of the traction chain, two of the spacing members being disposed adjacent the first named wheels, one being disposed in the middle of the runners and being longer than the other two, whereby to provide for taking up the slack of the chain, and urging the lower flight of the chain uniformly into engagement with the surface.

6. A motor sled including a hollow runner open along its lower edge, oppositely disposed wheels mounted in the runner, an endless traction chain passing over said wheels and composed of links, each link having a longitudinally extending laterally projecting rib, the inner faces of the runner being formed with relatively wide grooves for receiving said ribs, and limiting the upward and downward movement of the traction chain, and vertically movable slides mounted within the runner and engaging the upper and lower flights of the chain, said slides being longer than the diameters of the first named wheels.

7. In a motor sled, a pair of hollow runners, a traction element mounted in each runner, a yoke projecting from the inside face of each runner, and including a plurality of spaced arms, a driving shaft passing through said yoke and through the runners, whereby the yoke and runners are pivotally mounted upon the driving shaft for rocking movement in a vertical plane, and bearings mounted upon the body of the sled projecting downward between two of said arms on the first named yoke, and through which the driving shaft passes whereby to pivotally connect the body of the sled with the runners.

In testimony whereof I affix my signature in presence of two witnesses.

PER W. PALM. [L. S.]

Witnesses:
M. STEFFES,
ALBERT BERG.